US012729845B1

(12) United States Patent
Ai et al.

(10) Patent No.: US 12,729,845 B1
(45) Date of Patent: Sep. 8, 2026

(54) LIGHTING FIXTURE AND AMBIENT LIGHT

(71) Applicant: DONGGUAN ZOYO ELECTRONICS TECHNOLOGY CO., LTD., Dongguan (CN)

(72) Inventors: Shaochun Ai, Dongguan (CN); Jia Bai, Dongguan (CN); Mingsong Zheng, Dongguan (CN)

(73) Assignee: DONGGUAN ZOYO ELECTRONICS TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 19/372,336

(22) Filed: Oct. 29, 2025

(30) Foreign Application Priority Data

Sep. 17, 2025 (CN) ........................ 202511335524.0

(51) Int. Cl.
*F21V 31/00* (2006.01)
*F21V 3/06* (2018.01)
*F21V 17/10* (2006.01)
*F21V 23/00* (2015.01)
*F21V 23/06* (2006.01)

(52) U.S. Cl.
CPC ............ *F21V 31/005* (2013.01); *F21V 3/062* (2018.02); *F21V 17/101* (2013.01); *F21V 23/002* (2013.01); *F21V 23/005* (2013.01); *F21V 23/009* (2013.01); *F21V 23/06* (2013.01)

(58) Field of Classification Search
CPC ..... F21V 17/10–18; F21V 23/001–009; F21V 23/06; F21V 31/005
See application file for complete search history.

(56) References Cited

U.S. PATENT DOCUMENTS 8,779,459 B2 * 7/2014 Takeda .................... F21V 31/04
257/E33.056
12,013,104 B2 * 6/2024 Dai ........................ H05B 45/10

* cited by examiner

*Primary Examiner* — Jason M Han

(57) ABSTRACT

A lighting fixture includes a base, a light-transmitting cover, a circuit board, and connecting wires. Two connecting holes are provided at opposite sidewalls of the accommodation groove. The connecting wires sequentially pass through one of the connecting holes, the accommodation groove, and the other connecting hole. The light-transmitting cover is mounted on an end of the base. A connecting portion is provided at a connection of the planar portion and the side portion, the connecting portion is provided with a connecting groove, and the connecting groove is provided with a connecting protrusion. The boss portion is ultrasonically welded to the connecting protrusion, a part of the connecting protrusion flows out and fills a gap between the boss portion and the side portion, and the boss portion away from the base portion is inserted and fixed into the connecting groove. The structure achieves improved dustproof and waterproof effects.

9 Claims, 4 Drawing Sheets

LIGHTING FIXTURE AND AMBIENT LIGHT

CROSS REFERENCE TO RELATED APPLICATIONS

The present application claims the benefit of Chinese Patent Application No. 2025113355240 filed on Sep. 17, 2025, the contents of which are incorporated herein by reference in their entirety.

FIELD OF THE INVENTION

The present invention relates to the technical field of lighting fixtures, and in particular, to a lighting fixture and an ambient light.

BACKGROUND OF THE INVENTION

A lighting fixture generally includes a housing, a lamp cover, a light board, and wires. The housing is provided with an accommodation cavity and a penetration hole. The wires pass through the penetration hole into the accommodation cavity to electrically connect to the light board. The lamp cover is mounted on the housing to cover the accommodation cavity. Existing lighting fixtures on the market generally achieve waterproof and dustproof functions by glue filling and sealing. Sealing elements are provided at the penetration holes to isolate the accommodation cavity from the external environment. However, the means by glue filling and sealing are prone to issues such as air bubbles in the adhesive and inadequate control of the potting production process, leading to exposure of components. Similarly, sealing elements also face such problems and cannot guarantee complete isolation of the accommodation cavity from the external environment. Both methods fail to achieve a satisfactory sealing effect, consequently allowing dust and water droplets to easily enter the lighting fixture, which affects the illumination effect of the fixture and the stable power supply to the light board during long-term use.

SUMMARY OF THE INVENTION

An objective of the present invention is to provide a lighting fixture which achieves improved dustproof and waterproof effects, thereby ensuring the luminous effect and circuit stability of the lighting fixture.

Another objective of the present invention is to provide an ambient light including lighting fixtures therein which have good sealing performance and improved dustproof and waterproof effects, thereby ensuring the luminous effect and circuit stability of the lighting fixtures.

To achieve the above objectives, the present invention provides a lighting fixture including a base, a light-transmitting cover, a circuit board, and a plurality of connecting wires. The base includes a base portion and a boss portion extending upward from a top end of the base portion, the base is provided with an accommodation groove extending vertically through the boss portion and into the base portion, two connecting holes are provided at two opposite inner sidewalls of the accommodation groove, with the connecting holes extending horizontally and communicating with the base portion, the circuit board is arranged within the accommodation groove, and a top surface of the circuit board is provided with a light-emitting element electrically connected to the circuit board. The connecting wires sequentially pass through one of the connecting holes, the accommodation groove, and the other connecting hole, each of the connecting wires includes a conductive wire and an outer skin wrapping the conductive wire, the conductive wire is electrically connected to the circuit board via a conductive member, and an outer sidewall of the outer skin is fixedly connected to an inner sidewall of the connecting hole by integral injection molding. The light-transmitting cover is mounted on an end of the base provided with the accommodation groove, the light-transmitting cover includes a planar portion and a side portion, the side portion is formed on a surface of the planar portion facing the base and extended along a circumference of the planar portion, a connecting portion extending along the circumference of the planar portion is provided at an angle formed by a connection of the planar portion and the side portion, a surface of the connecting portion orthogonal to the side portion is provided with a connecting groove extending along the connecting portion, an inner sidewall of the connecting groove close to the side portion is provided with a connecting protrusion extending along the connecting portion, an end of the boss portion away from the base portion is ultrasonically welded to the connecting protrusion, during welding, a part of the connecting protrusion flows out in a fluid state and fills a gap between an outer sidewall of the boss portion and an inner sidewall of the side portion, and the end of the boss portion away from the base portion is inserted and fixed into the connecting groove.

As a preferable embodiment, the light-transmitting cover is a PC material, the outer skin is a PVC material, and the base is a PVC-ABS alloy material.

As a preferable embodiment, each of the two opposite inner sidewalls of the accommodation groove is protruded inward with a support portion, an upper surface of the support portion is provided with at least one first support pillar, the first support pillar is provided with a screw hole extending vertically, the two connecting holes respectively penetrate through the two support portions and communicate with the accommodation groove, and an end of the screw hole close to the support portion communicates with one of the connecting holes.

As a preferable embodiment, a bottom surface of the circuit board is pressed against the first support pillar, and the circuit board is provided with a plurality of through-hole pads penetrating through the circuit board and electrically connected to the circuit board.

As a preferable embodiment, the conductive member includes a plurality of conductive screws, each of the conductive screws includes a head and a screw portion, the screw portion passes through the through-hole pads and is threaded into the screw hole, an end of the screw portion away from the head pierces the outer skin and is electrically connected to the conductive wires, and the head is pressed against an upper surface of the through-hole pads, and the plurality of conductive wires are respectively electrically connected to the light-emitting element.

As a preferable embodiment, at least one edge of the head is laser-welded to an upper surface of the circuit board.

As a preferable embodiment, two opposite outer sidewalls of the base are each provided with a limiting portion corresponding to the support portion, and the connecting hole penetrates through the limiting portion.

As a preferable embodiment, a bottom wall of the accommodation groove is provided with a plurality of second support pillars extending vertically, the second support pillars are pressed against a surface of the circuit board facing away from the light-transmitting cover, and an end surface of an end of the second support pillar abutting the circuit board is at the same height as an end surface of an end of the first support pillar away from the support portion.

As a preferable embodiment, the light-transmitting cover further includes a lens portion penetrating a middle portion of the planar portion, the light-emitting element is arranged at a middle portion of a surface of the circuit board facing the light-transmitting cover, an end surface of the lens portion facing the light-emitting element is concave, and an outer end surface of the lens portion is convex.

As a preferable embodiment, the light-transmitting cover further includes a lens portion penetrating a middle portion of the planar portion, and a surface of the planar portion facing the light-emitting element is provided with a plurality of pyramidal protrusions arranged between the connecting portion and the lens portion.

To achieve the above objectives, the present invention further provides an ambient light, including a plurality of lighting fixtures arranged at intervals, and the connecting wires of every two adjacent lighting fixtures are connected to each other.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

To elaborate on the technical content, structural features, objectives, and effects of the present invention, the following detailed explanation is provided in conjunction with embodiments and accompanying drawings.

Figure 1:
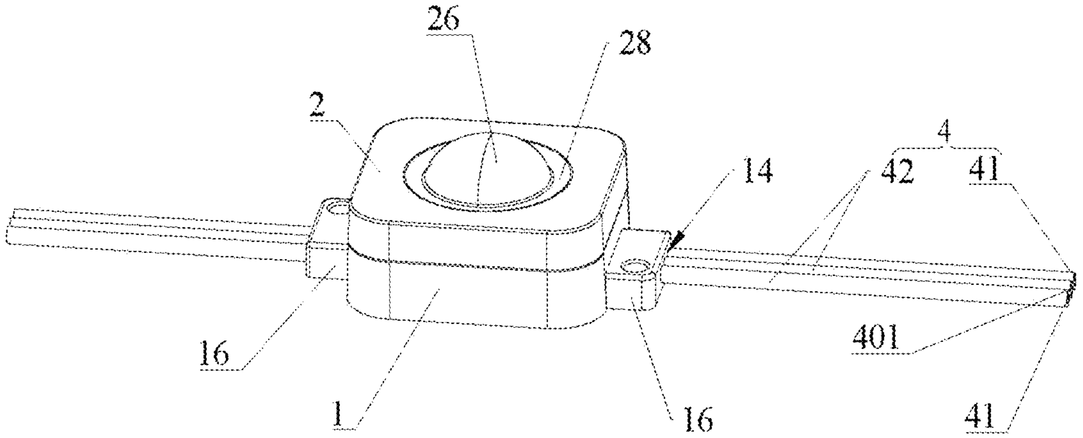
FIG. 1 is a perspective view of a lighting fixture according to an embodiment of the present invention.
Figure 2:
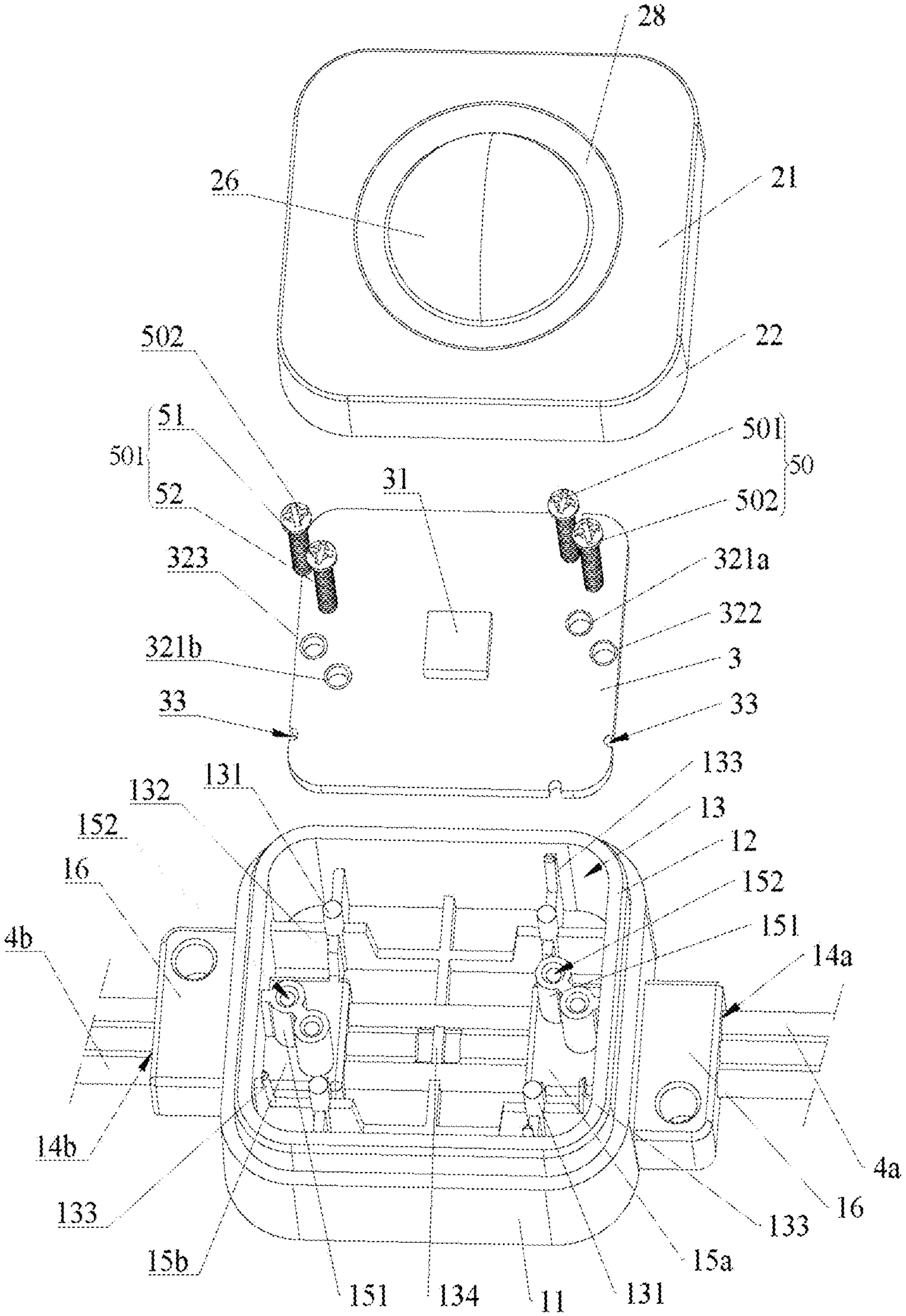
FIG. 2 is an exploded view of the lighting fixture from a first perspective according to an embodiment of the present invention.
Figure 3:
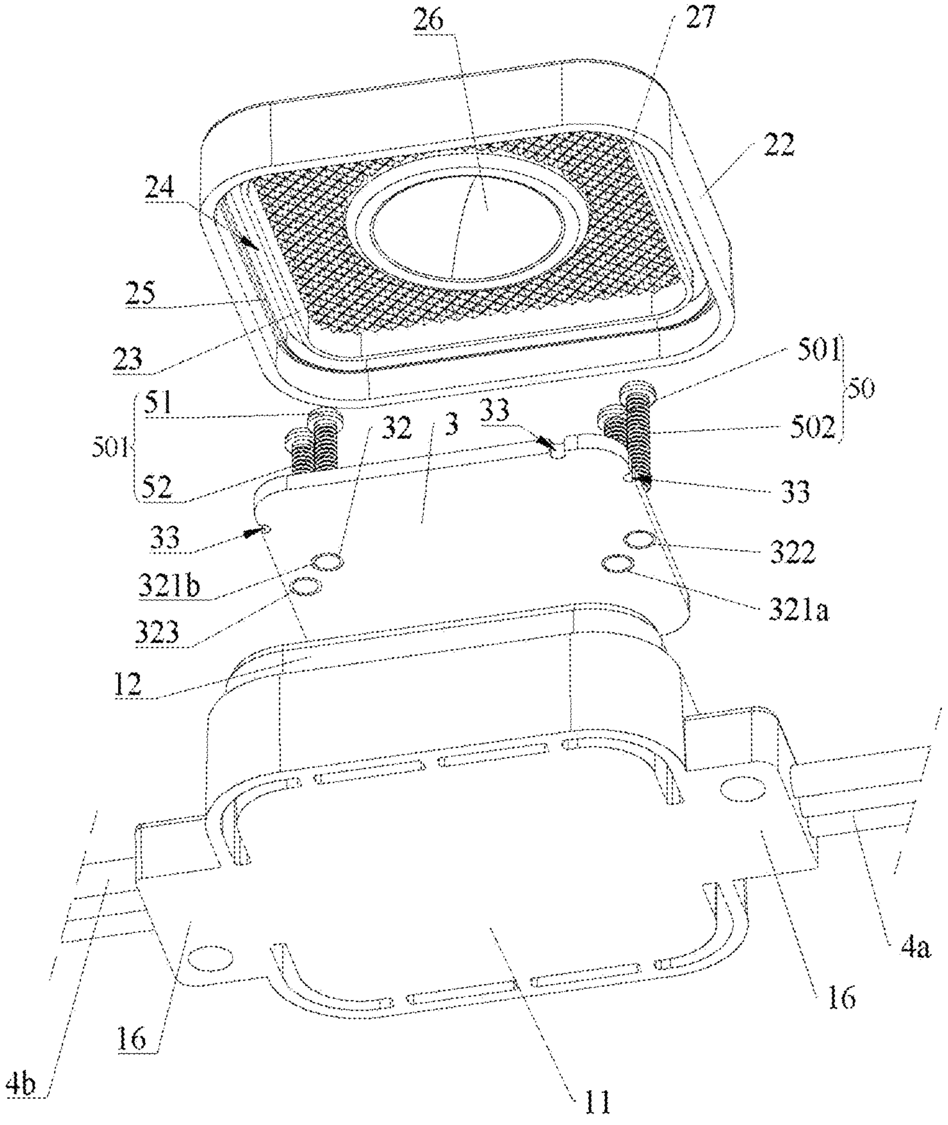
FIG. 3 is an exploded view of the lighting fixture from a second perspective according to an embodiment of the present invention.
Figure 4:
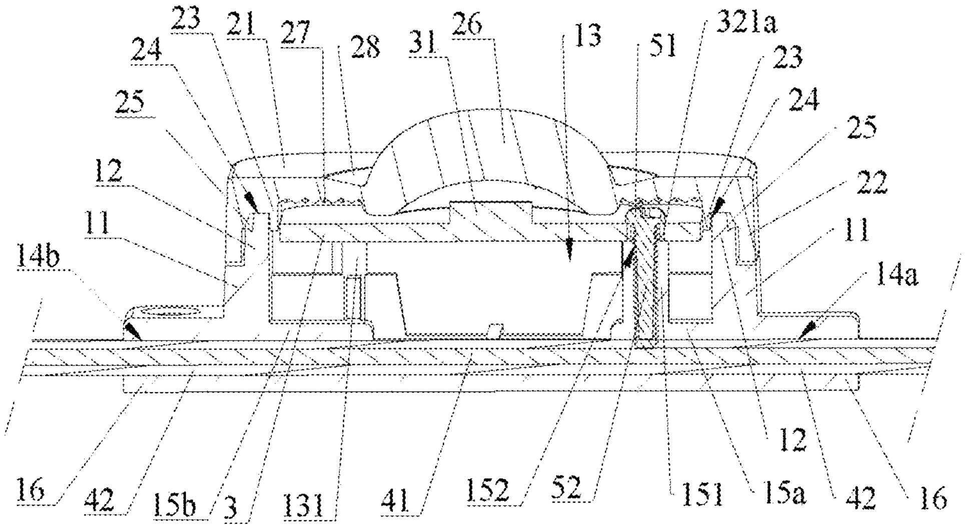
FIG. 4 is a cross-sectional view of the lighting fixture before ultrasonic welding according to an embodiment of the present invention.
Figure 5:
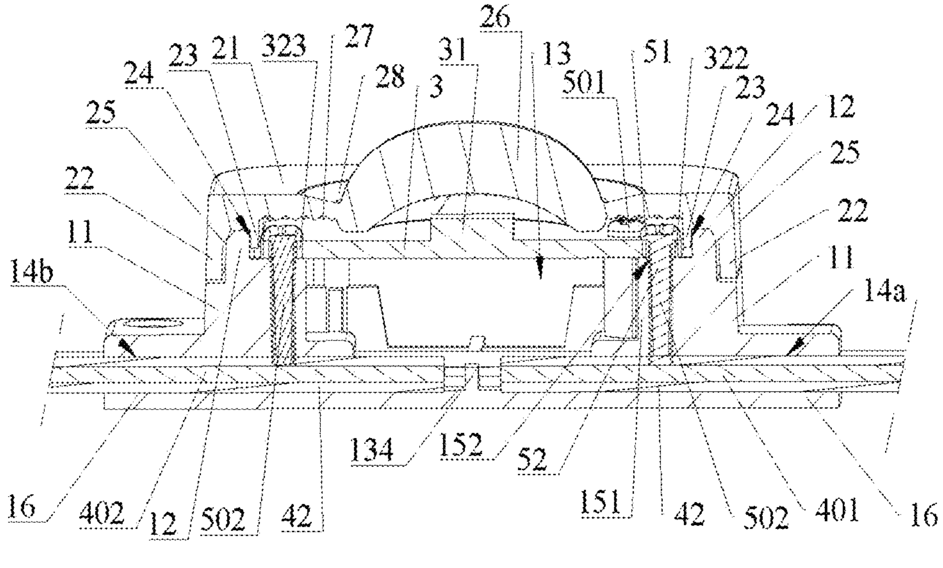
FIG. 5 is a cross-sectional view of the lighting fixture after ultrasonic welding according to an embodiment of the present invention.

With reference to FIGS. 1 to 5, the present invention discloses a lighting fixture including a base 1, a light-transmitting cover 2, a circuit board 3, and a plurality of connecting wires 4.

The base 1 includes a base portion 11 and a boss portion 12 extending upward from a top end of the base portion 11. The base 1 is provided with an accommodation groove 13 extending vertically through the boss portion 12 and into the base portion 11. Two connecting holes 14 are provided at two opposite inner sidewalls of the accommodation groove 13, and each of the connecting holes 14 extends horizontally and communicates with the base portion 11. The circuit board 3 is arranged within the accommodation groove 13, and a middle portion of a top surface of the circuit board 3 is provided with a light-emitting element 31 electrically connected to the circuit board 3.

The connecting wires 4 sequentially pass through one connecting hole 14*a*, the accommodation groove 13, and the other connecting hole 14*b*. Each connecting wire 4 includes a conductive wire 41 and an outer skin 42 wrapping the conductive wire 41. The conductive wire 41 is electrically connected to the circuit board 3 via a conductive member 50. An outer sidewall of the outer skin 42 is fixedly connected to an inner sidewall of the connecting hole 14 by integral injection molding.

The light-transmitting cover 2 is mounted on an end of the base 1 provided with the accommodation groove 13. The light-transmitting cover 2 includes a planar portion 21 and a side portion 22. The side portion 22 is formed on a surface of the planar portion 21 facing the base 1 and extends along a circumference of the planar portion 21. A connecting portion 23 is provided at an angle formed by the connection of the planar portion 21 and the side portion 22 and extends along the circumference of the planar portion 21. A surface of the connecting portion 23 orthogonal to the side portion 22 is provided with a connecting groove 24 extending along the connecting portion 23. An inner sidewall of the connecting groove 24 close to the side portion 22 is provided with a connecting protrusion 25 extending along the connecting portion 23. An end of the boss portion 12 away from the base portion 11 is ultrasonically welded to the connecting protrusion 25, during welding, a part of the connecting protrusion 25 flows out in a fluid state and fills a gap between an outer sidewall of the boss portion 12 and an inner sidewall of the side portion 22. The end of the boss portion 12 away from the base portion 11 is inserted and fixed into the connecting groove 24.

Compared with the prior art, the two inner sidewalls of the accommodation groove 13 of the base 1 of the present invention are each provided with a connecting hole 14. The connecting wires 4 sequentially pass through one connecting hole 14*a*, the accommodation groove 13, and the other connecting hole 14*b*. The light-transmitting cover 2 is mounted on the base 1. The connecting portion 23 is provided at the angle formed by the connection of the planar portion 21 and the side portion 22 of the light-transmitting cover 2. The connecting portion 23 is provided with the connecting groove 24, and the inner sidewall of the connecting groove 24 close to the side portion 22 is provided with the connecting protrusion 25. Specifically, the outer sidewall of the outer skin 42 of the connecting wire 4 is fixedly connected to the inner sidewall of the connecting hole 14 of the base 1 by integral injection molding. The boss portion 12 of the base 1 is ultrasonically welded to the connecting protrusion 25 of the light-transmitting cover 2, during welding, part of the connecting protrusion 25 flows out in a fluid state and fills the gap between the outer sidewall of the boss portion 12 of the base 1 and the inner sidewall of the side portion 22 of the light-transmitting cover 2, thereby achieving the sealing. The end of the boss portion 12 away from the base portion 11 is inserted and fixed into the connecting groove 24. In such configurations and arrangements, the lighting fixture can obtain good sealing performance, thereby achieving improved dustproof and waterproof effects, which is conducive to ensuring the luminous effect and circuit stability of the lighting fixture.

With reference to FIGS. 1 to 5, the light-transmitting cover 2 is PC material, the outer skin 42 is PVC material, and the base 1 is a PVC-ABS alloy material. The base 1 is a material that can not only be ultrasonically sealed and connected to the light-transmitting cover 2 but also integrally fused with the outer skin 42 of the connecting wire 4, while also meeting the requirements of material rating F1. This facilitates the formation of good air tightness and adhesion after the base 1 and the outer skin 42 are integrally injection molded, and simultaneously allows the base 1 to fully fuse with the light-transmitting cover 2 during ultrasonic welding, thereby effectively enhancing the sealing performance of the lighting fixture.

Referring to FIGS. 1 to 5, each of the two opposite inner sidewalls of the accommodation groove 13 is protruded inward with a support portion 15. An upper surface of each support portion 15 is provided with at least one first support pillar 151. The first support pillar 151 is provided with a screw hole 152 extending vertically therethrough. The two connecting holes 14 respectively penetrate through the two support portions 15 and communicate with the accommodation groove 13. An end of the screw hole 152 close to the support portion 15 communicates with the corresponding connecting hole 14.

A bottom surface of the circuit board 3 is pressed against the first support pillars 151. The circuit board 3 is provided with a plurality of through-hole pads 32 penetrating through the circuit board 3 and electrically connected to the circuit board 3.

The conductive member 50 includes a plurality of conductive screws 501. Each conductive screw 501 includes a head 51 and a screw portion 52. The screw portion 52 passes through the through-hole pad 32 and is threaded into the screw hole 152. An end of the screw portion 52 away from the head 51 pierces the outer skin 42 and is electrically connected to the corresponding conductive wire 41. The head 51 is pressed against an upper surface of the through-hole pad 32, so that the plurality of conductive wires 41 are respectively electrically connected to the light-emitting element 31.

The circuit board 3 is mounted to the base 1 by means of the conductive screws 501, which also achieves the electrical connection between the through-hole pad 32 of the circuit board 3 and the conductive wire 41 of the connecting wire 4, thereby facilitating the power supply from the connecting wire 4 to the circuit board 3 through the conductive screw 501. In such structure, the original soldering operation can be eliminated, thereby effectively simplifying the assembly steps, and improving the assembly efficiency of the lighting fixture. Furthermore, the structure where the conductive screw 501 is electrically connected to the through-hole pad 32 and the conductive wire 41 respectively can enhance the connection stability between the conductive wire 41 and the circuit board 3, avoiding issues like cold solder joints and false soldering common in soldering operations, which is beneficial for improving the reliability and yield of the lighting fixture.

Referring to FIGS. 1 to 5, at least one edge of the head 51 is laser-welded to the upper surface of the circuit board 3, which is conducive to the conductive screw 501 being firmly and closely attached to the through-hole pad 32 on the circuit board 3, further enhancing the connection stability between the conductive wire 41 and the circuit board 3.

With reference to FIGS. 1 to 5, two opposite outer sidewalls of the base 1 are each provided with a limiting portion 16 corresponding to the support portion 15. The connecting hole 14 penetrates through the limiting portion 16. The limiting portion 16 can increase the length of the connecting hole 14, which is beneficial for further improving the air tightness and adhesion after the base 1 and the outer skin 42 are integrally injection molded, while also restricting the movement of the connecting wire 4 and reducing the risk of breakage of the connecting wire 4.

As shown, a bottom wall of the accommodation groove 13 is provided with a plurality of second support pillars 131 extending vertically. The second support pillars 131 abut against a surface of the circuit board 3 facing away from the light-transmitting cover 2. An end surface of an end of the second support pillar 131 abutting the circuit board 3 is at the same height as an end surface of an end of the first support pillar 151 away from the support portion 15, which is conducive to improving the mounting stability of the circuit board 3 within the accommodation groove 13.

Specifically, in the present embodiment, four second support pillars 131 are provided and are respectively located near the diagonal corners of the accommodation groove 13. The inner sidewall of the accommodation groove 13 is further protrudes outward with a plurality of connection stability portions 132 which are fixedly connected to the outer sidewalls of the second support pillars 131.

Furthermore, at least one inner sidewall of the accommodation groove 13 is provided with a positioning protrusion 133. At least one edge of the circuit board 3 is provided with a positioning opening 33 extending vertically. The positioning protrusion 133 passes vertically through the positioning opening 33.

Specifically, in the present embodiment, each inner sidewall of the accommodation groove 13 is provided with a positioning protrusion 133, and each pair of corresponding positioning protrusions 133 is arranged collinearly with two second support pillars 131. This configuration ensures that the circuit board 3 can only be installed into the accommodation groove 13 in a specific orientation, thereby allowing the through-hole pads 32 to be accurately aligned with the screw holes 152 of the corresponding first support pillars 151.

With reference to FIGS. 1 to 5, the lighting fixture further includes a plurality of connection screws 502, a first communication wire 401 wrapped by an outer skin 42, and a second communication wire 402 wrapped by an outer skin 42. The first communication wire 401 passes through one connecting hole **14*a*, and the second communication wire 402 passes through the other connecting hole 14*b***.

The circuit board 3 is further provided with a controller. The controller is provided with an input port and an output port. The through-hole pads 32 include a plurality of first through-hole pads 321 electrically connected to the light-emitting element 31, a second through-hole pad 322 electrically connected to the input port, and a third through-hole pad 323 electrically connected to the output port.

A plurality of first support pillars 151 are provided and are correspondingly connected to either conductive screws 501 or connection screws 502. The plurality of first through-hole pads 321 are electrically connected to the corresponding conductive wires 41 via the conductive screws 501, respectively. The second through-hole pad 322 is electrically connected to the first communication wire 401 via a connection screw 502. The third through-hole pad 323 is electrically connected to the second communication wire 402 via a connection screw 502.

Specifically, in the present embodiment, each support portion 15 is provided with two first support pillars 151. Two connecting wires 4 are arranged side by side, namely including a positive wire **4*a* and a negative wire 4*b*. Two first through-hole pads 321 are provided corresponding to the positive wire 4*a* and the negative wire 4*b*. The positive wire 4*a* is electrically connected to one first through-hole pad 321*a* via a conductive screw 501 connected to a first support pillar 151 on one support portion 15*a*. The negative wire 4*b* is electrically connected to the other first through-hole pad 321*b* via a conductive screw 501 connected to a first support pillar 151 on the other support portion 15*b*. The first communication wire 401 is electrically connected to the second through-hole pad 322 via a connection screw 502** connected to a first support pillar 151 on the one support portion 15*a*. The second communication wire 402 is electrically connected to the third through-hole pad 323 via a connection screw 502 connected to a first support pillar 151 on the other support portion 15*b*, but the configuration is not limited thereto.

Specifically, in the present embodiment, the controller is a control IC. The input port and output port of the controller are the DIN interface and DO interface of the control IC, respectively, which serve as communication interfaces for the control IC. They are used to receive data signals transmitted via the first communication wire 401 and to transmit data signals processed by the control IC to the next lighting fixture in the series via the second communication wire 402, thereby enabling individual control of each lighting fixture.

Specifically, in the present embodiment, the first communication wire 401 and the second communication wire 402 are arranged side by side with the connecting wires 4 and are located between the two connecting wires 4. The bottom wall of the accommodation groove 13 is provided with an insulation barrier block 134 located between the ends of the first communication wire 401 and the second communication wire 402. The structure and connection method of the connection screws 502, the first communication wire 401, and the second communication wire 402 are consistent with those of the aforementioned conductive screws 501 and conductive wires 41, and therefore will not be reiterated.

With reference to FIGS. 1 to 5, the light-transmitting cover 2 further includes a lens portion 26 penetrating a middle portion of the planar portion 21. The light-emitting element 31 is arranged corresponding to the lens portion 26 at a middle portion of a surface of the circuit board 3 facing the light-transmitting cover 2. An end surface of the lens portion 26 facing the light-emitting element 31 is concave, and an outer end surface of the lens portion 26 is convex.

Light emitted by the light-emitting element 31 is refracted by the concave inner end surface of the lens portion 26 to achieve a light-mixing optical effect, and is then refracted by the convex outer end surface of the lens portion 26 to achieve a light-diffusing optical effect. Utilizing this secondary optics effect, the direction of the light emitted by the light-emitting element 31 is altered, and a specific beam emission angle is formed, which helps to make the light emitted from the light-transmitting cover 2 more uniform.

With reference to FIGS. 1 to 5, the light-transmitting cover 2 further includes a lens portion 26 penetrating a middle portion of the planar portion 21. A surface of the planar portion 21 facing the light-emitting element 31 is provided with a plurality of pyramidal protrusions 27 arranged between the connecting portion 23 and the lens portion 26. These protrusions can eliminate stray light emitted by the light-emitting element 31, thereby improving the light emission effect of the fixture, and also serve to obscure the internal circuit board 3 from view, achieving an aesthetic effect for the lighting fixture.

With reference to FIGS. 1 to 5, the light-transmitting cover 2 further includes a lens portion 26 penetrating a middle portion of the planar portion 21. A surface of the planar portion 21 facing away from the base 1 is provided with an annular concave surface 28 surrounding the lens portion 26. Refraction through the annular concave surface 28 helps to make the light emitted from the light-transmitting cover 2 more uniform. Furthermore, the annular concave surface 28 can serve as an identifier, enhancing the recognizability of the lighting fixture.

With reference to FIGS. 1 to 5, the present invention discloses an ambient light including a plurality of the aforementioned lighting fixtures having good sealing performance arranged at intervals, wherein the connecting wires 4 of every two adjacent lighting fixtures are connected to each other.

The above disclosure is only preferred embodiments of the present invention and cannot be used to limit the scope of rights of the present invention. Therefore, any equivalent changes made in accordance with the claims of the present invention are within the scope of the present invention.

What is claimed is:

1. A lighting fixture, comprising:

a base, a light-transmitting cover, a circuit board, and a plurality of connecting wires;

wherein the base comprises a base portion and a boss portion extending upward from a top end of the base portion, the base is provided with an accommodation groove extending vertically through the boss portion and into the base portion, two connecting holes are provided at two opposite inner sidewalls of the accommodation groove, with the connecting holes extending horizontally and communicating with the base portion, the circuit board is arranged within the accommodation groove, and a top surface of the circuit board is provided with a light-emitting element electrically connected to the circuit board;

the connecting wires sequentially pass through one of the connecting holes, the accommodation groove, and the other connecting hole, each of the connecting wires comprises a conductive wire and an outer skin wrapping the conductive wire, the conductive wire is electrically connected to the circuit board via a conductive member, and an outer sidewall of the outer skin is fixedly connected to an inner sidewall of the connecting hole by integral injection molding;

the light-transmitting cover is mounted on an end of the base provided with the accommodation groove, the light-transmitting cover comprises a planar portion and a side portion, the side portion is formed on a surface of the planar portion facing the base and extended along a circumference of the planar portion, a connecting portion extending along the circumference of the planar portion is provided at an angle formed by a connection of the planar portion and the side portion, a surface of the connecting portion orthogonal to the side portion is provided with a connecting groove extending along the connecting portion, an inner sidewall of the connecting groove close to the side portion is provided with a connecting protrusion extending along the connecting portion, an end of the boss portion away from the base portion is ultrasonically welded to the connecting protrusion, during welding, a part of the connecting protrusion flows out in a fluid state and fills a gap between an outer sidewall of the boss portion and an inner sidewall of the side portion, and the end of the boss portion away from the base portion is inserted and fixed into the connecting groove.

2. The lighting fixture according to claim 1, wherein the light-transmitting cover is a PC material, the outer skin is a PVC material, and the base is a PVC-ABS alloy material.

3. The lighting fixture according to claim 1, wherein each of the two opposite inner sidewalls of the accommodation groove is protruded inward with a support portion, an upper surface of the support portion is provided with at least one first support pillar, the first support pillar is provided with a screw hole extending vertically therethrough, the two connecting holes respectively penetrate through the two support portions and communicate with the accommodation groove, and an end of the screw hole close to the support portion communicates with one of the connecting holes;

a bottom surface of the circuit board is pressed against the first support pillar, and the circuit board is provided with a plurality of through-hole pads penetrating through the circuit board and electrically connected to the circuit board;

the conductive member comprises a plurality of conductive screws, each of the conductive screws comprises a head and a screw portion, the screw portion passes through the through-hole pads and is threaded into the screw hole, an end of the screw portion away from the head pierces the outer skin and is electrically connected to the conductive wires, and the head is pressed against an upper surface of the through-hole pads, and the plurality of conductive wires are respectively electrically connected to the light-emitting element.

4. The lighting fixture according to claim 3, wherein at least one edge of the head is laser-welded to an upper surface of the circuit board.

5. The lighting fixture according to claim 3, wherein two opposite outer sidewalls of the base are each provided with a limiting portion corresponding to the support portion, and the connecting hole penetrates through the limiting portion.

6. The lighting fixture according to claim 3, wherein a bottom wall of the accommodation groove is provided with a plurality of second support pillars extending vertically, the second support pillars are pressed against a surface of the circuit board facing away from the light-transmitting cover, and an end surface of an end of the second support pillar abutting the circuit board is at the same height as an end surface of an end of the first support pillar away from the support portion.

7. The lighting fixture according to claim 1, wherein the light-transmitting cover further comprises a lens portion penetrating a middle portion of the planar portion, the light-emitting element is arranged at a middle portion of a surface of the circuit board facing the light-transmitting cover, an end surface of the lens portion facing the light-emitting element is concave, and an outer end surface of the lens portion is convex.

8. The lighting fixture according to claim 1, wherein the light-transmitting cover further comprises a lens portion penetrating a middle portion of the planar portion, and a surface of the planar portion facing the light-emitting element is provided with a plurality of pyramidal protrusions arranged between the connecting portion and the lens portion.

9. An ambient light, comprising a plurality of lighting fixtures arranged at intervals, wherein each lighting fixture is according to claim 1, and the connecting wires of every two adjacent lighting fixtures are connected to each other.

* * * * *